G. C. JENSEN.
LOCK CONTROLLED LEVER LOCKING MECHANISM.
APPLICATION FILED MAY 21, 1917.
1,265,667.
Patented May 7, 1918.
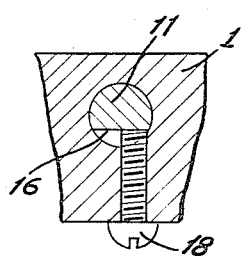
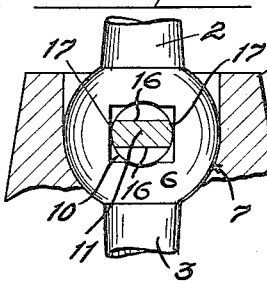
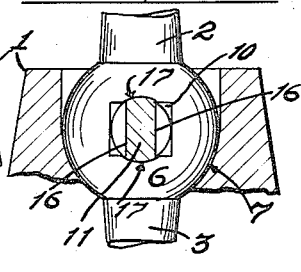
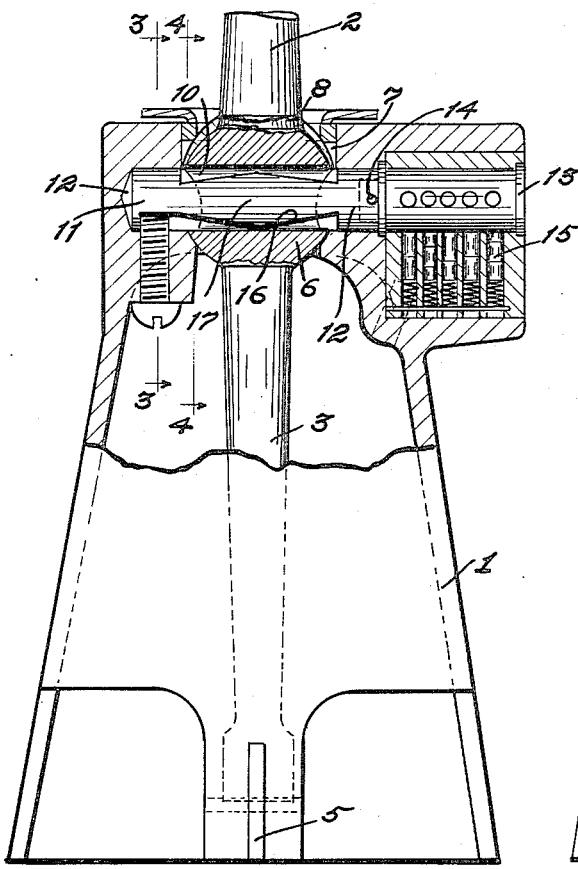
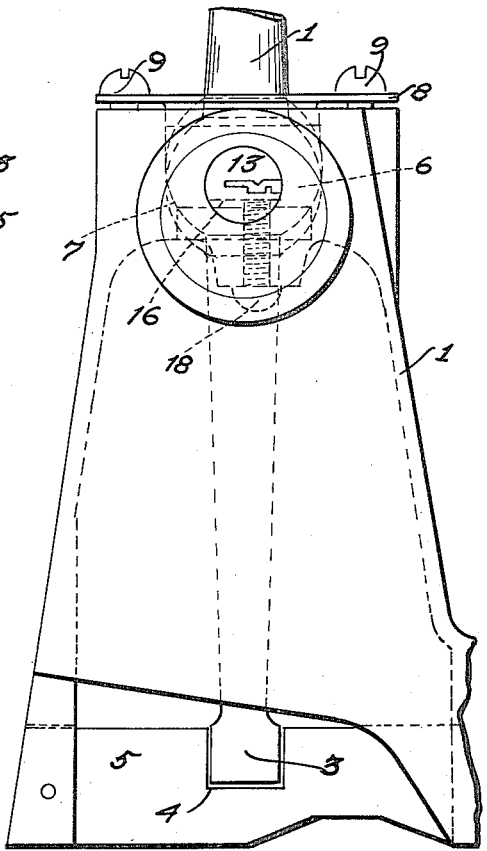
WITNESS:
Wm F. Drew
INVENTOR.
George C. Jensen
BY
Cesser & Totten
ATTORNEYS.

UNITED STATES PATENT OFFICE.

GEORGE C. JENSEN, OF OAKLAND, CALIFORNIA.

LOCK-CONTROLLED LEVER-LOCKING MECHANISM.

1,265,667.      Specification of Letters Patent.      Patented May 7, 1918.

Application filed May 21, 1917. Serial No. 169,902.

*To all whom it may concern:*

Be it known that I, GEORGE C. JENSEN, a citizen of the United States, residing at Oakland, in the county of Alameda and State of California, have invented certain new and useful Improvements in Lock-Controlled Lever-Locking Mechanism, of which the following is a specification.

The present invention relates to improvements in locking devices for gear shift levers of motor vehicles and more particularly to a construction capable of incorporation with any of the well known types of levers fulcrumed for universal movement and now commonly in use, and by the use of which the lever may be locked from movement when in neutral position, thereby preventing the engagement of the shiftable gears and precluding the car or vehicle from being operated under its own power.

The invention consists broadly in providing a rotatable lever locking member passing through the lever and capable of movement to one position to prevent the swinging of the lever on its fulcrum, and when in another position to permit free movement of the lever on said fulcrum, and to employ in connection with said shaft a key controlled means for locking the same from movement.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in elevation, partly in section, of the preferred embodiment of my invention, illustrating the locking shaft passing through the fulcrum and in a position to permit of operative movement of the lever.

Fig. 2 is a view in side elevation. Fig. 3 is a sectional view taken on line 3—3 of Fig. 1. Fig. 4 is a sectional view taken on line 4—4 of Fig. 1. Fig. 5 is a view similar to Fig. 4 but with the locking shaft rotated to a position to lock the lever from movement.

Referring more particularly to the several views of the drawings, wherein like characters of reference designate corresponding parts,—1 indicates a tubular casing adapted for attachment to the usual housing for inclosing the shiftable gear members of a variable speed vehicle transmission mechanism, and through said housing extends the gear shifting lever 2 adapted for operative movement in two vertical planes parallel to each other, and for selective movement in a plane transverse to said planes of operative movement. The lower end 3 of said lever, when the same is in its plane of selective movement, lies within a cutout 4 in a suitable guide 5, it being necessary for the lower end of said lever to pass through said cutout prior to engaging the respective gears before the same are shifted. The lever is formed with a substantially spherical portion 6 resting in a socket 7 providing a fulcrum therefor, it being retained therein by an annular plate 8 held in position on top of the casing by the screws 9.

The spherical portion 6 of the lever is formed with a transverse bore 10 therethrough, the bore being substantially rectangular in cross section, and passing through said bore is a locking shaft or member 11 rotatably supported at its opposite ends, as at 12, within the upper end of the housing.

Coöperating with the outer end of said shaft 11 is a locking barrel 13 positioned in line therewith and connected thereto by a suitable pin 14. In the form illustrated, the barrel is preferably of the key controlled type, and when rotated to rotate the shaft 11 to operative position is retained in said position by the locking pins 15.

Within the confines of the spherical portion 6 of the lever the locking shaft 11 is formed on opposite sides with flat tapering surfaces 16 which converge toward the bearing ends of said shaft 6, providing a portion of the shaft which is narrow adjacent the outer edges of said spherical portion and is thickest through its center. This permits of the side or selective movement of the lever to enable the lower end 3 thereof to pass through the depression 4 when the shaft is rotated to a position, as in Fig. 4 of the drawings.

When it is desired to lock the lever in its plane of selective movement with the lower end 3 thereof in the recess 4, it may be accomplished by rotating the shaft 11 a one-quarter turn to position the uncut portion 17 thereof at the upper and lower edges of the transverse bore 10. The shaft 11 is limited in its rotation by the adjusting screw 18 passing upwardly through the interior of the portion 12 for coöperating with the bolt, as in Fig. 3.

It will be apparent that by providing the rotating locking shaft 11 and incorporating in connection therewith a controlling means capable of being locked, that on one position of said shaft movement of the lever is permitted, and on the movement of the shaft to another position the lever is locked from movement and is in its neutral position.

From the above construction it will be readily understood that when the bolt 11 is rotated to a position as in Figs. 1 and 4 of the drawings, the surfaces thereof adjacent the periphery of the spherical portion 6 are spaced from the upper and lower walls of the opening 10 thereof, permitting of a side motion of the lever. When it is desired to lock the lever from selective movement, a controlling key, not shown, may be inserted in the barrel 13 to release the tumblers 15 to permit the rotation of the bolt 11 to a position, as in Fig. 5, at which time the solid portions of said bolt are in contact with the upper and lower walls of the opening 10 and prevent lateral movement of said lever.

Having thus described my invention, what I claim as new and desire to protect by Letters Patent is:—

1. In combination with a lever fulcrumed within its length for universal swinging movement and provided at its fulcrum point with an open ended bore, a guide transversely through which the lower end of said lever passes when lateral movement is imparted thereto, a rotatable bolt extending through said bore and capable of rotative movement to engage the upper and lower surfaces of opposing ends of said bore to lock the lever from lateral movement with the lower end thereof within said guide, and lock controlled means for retaining said bolt in said position.

2. In combination with a lever fulcrumed within its length for operative movement in two parallel planes perpendicular to each other and for selective movement in a plane transverse to said planes of operative movement, said lever provided in its fulcrum with an open ended transverse bore, a guide through which the lower end of said lever passes when in its plane of selective movement, a rotatably mounted bolt projecting through said bore and when in one position permitting of selective movement of said lever and when in another position contacting with the opposite faces of one end of said bore for locking said lever in its plane of selective movement within said guide, and lock controlled means coöperating with said bolt.

3. In combination with a lever provided at its fulcrum portion with a transverse bore, a tubular support through which the lever passes and which provides a fulcrum for the same within its length, a locking bolt projecting through said transverse bore and rotatably mounted in said support, said bolt recessed on opposite sides to permit of movement of said lever on its fulcrum and capable of rotation to engage the opposite face of one end of said bore to lock said lever from operative movement, and lock controlled means associated therewith.

4. In combination with a lever formed within its length with a spherical portion, a socket for receiving said portion and providing a fulcrum therefor, said lever provided with a transverse opening through said spherical portion, a locking bolt rotatably supported by the wall of said socket and projecting through said opening, said bolt provided on its surface with recesses to permit of the movement of said lever on its fulcrum, and capable of rotation to engage the opposing walls of said opening to lock said lever from movement, and lock controlled means coöperating with said bolt.

5. In combination with a lever fulcrumed within its length for universal swinging movement and formed at its fulcrum point with a transverse bore, a rotatable bolt projecting into the said bore in said lever and provided on opposite faces with a recess, said bolt capable of rotative movement to cause the depressions in the surface thereof to lie in spaced relation to opposite sides of the wall of said bore to permit of movement of the lever on its fulcrum and movement to another position to cause the surface thereof to contact with the opposite walls of said opening to lock said lever from operative movement, and lock controlled means for said bolt.

6. In combination with a fulcrumed lever provided at its fulcrum portion with an open ended transversely extending bore, a locking bolt extending through said bore, the cross sectional area of opposite ends of said bolt in one plane being less than the bore through which it passes and in another plane at an angle to said first plane being substantially equal to the cross sectional area of said bore, said locking bolt capable of rotative movement to position the surface thereof of greater cross sectional area to contact with the surface of said bore to lock the lever from movement and for movement to position the surface thereof of less cross sectional area in spaced relation to the surface of said bore to permit of operative movement of said lever, and lock controlled means for locking said bolt.

7. In combination with a fulcrumed lever provided transversely of its fulcrum point with an open ended bore, a locking bolt of different cross sectional area throughout its length extending through said bore and movable therein, said bolt adapted when lying in one position within said bore to engage the upper and lower faces of the opposite ends of the same to prevent lateral movement of the lever on its fulcrum and when in another position to lie in spaced relation to the upper and lower faces of the opposite ends of said bore to permit of lateral movement of said lever.

8. In combination with a lever fulcrumed within its length for universal swinging movement and provided at its fulcrum point with a bore, a guide transversely through which the lower end of said lever passes when lateral movement is imparted thereto, a rotatable bolt extending into said bore, the cross sectional area of said bolt being different throughout its length, said bolt capable of rotative movement to position the portion thereof of greater cross sectional area to engage the surface of one end of said bore to lock the lever from lateral movement with the lower end thereof within said guide, and lock controlled means for retaining said bolt in said position.

In testimony whereof I have signed my name to this specification in the presence of a subscribing witness.

GEORGE C. JENSEN.

Witness:
D. B. RICHARDS.